United States Patent [19]
Flamme et al.

[11] Patent Number: 6,079,340
[45] Date of Patent: Jun. 27, 2000

[54] APPARATUS FOR CUSTOMIZING THE RATE AT WHICH FARMING MATERIAL IS APPLIED TO AN AGRICULTURAL FIELD

[75] Inventors: David D. Flamme, Hinsdale; David N. Rounds, Chicago; Brian A. Hartman, Clarandon Hills; Randolph T. Newton, Chicago, all of Ill.

[73] Assignee: Case Corporation, Racine, Wis.

[21] Appl. No.: 09/038,491

[22] Filed: Mar. 10, 1998

Related U.S. Application Data

[63] Continuation-in-part of application No. 08/935,406, Sep. 23, 1997, Pat. No. 5,924,371.

[51] Int. Cl.$^7$ .................................................. A01C 7/00
[52] U.S. Cl. ........................... 111/178; 111/200; 111/903; 701/50
[58] Field of Search ...................... 111/200, 900, 111/118, 119, 127, 129, 130, 8, 9, 903, 177, 178; 172/2, 4.5; 701/50; 221/211, 150 A

[56] References Cited

U.S. PATENT DOCUMENTS

| | | |
|---|---|---|
| 3,885,704 | 5/1975 | Lienemann et al. . |
| 5,193,469 | 3/1993 | Tochor ................................. 111/200 X |
| 5,220,876 | 6/1993 | Monson et al. ...................... 111/200 X |
| 5,598,794 | 2/1997 | Harms et al. ........................ 111/200 X |
| 5,605,105 | 2/1997 | Clark et al. .............................. 111/127 |
| 5,646,846 | 7/1997 | Bruce et al. ........................ 111/200 X |
| 5,655,468 | 8/1997 | Ledermann et al. . |
| 5,924,371 | 7/1999 | Flamme et al. .......................... 111/177 |

Primary Examiner—Victor Batson
Attorney, Agent, or Firm—Foley & Lardner

[57] ABSTRACT

Disclosed is farming apparatus for customizing the rate at which farming material such as seeds, fertilizers, herbicides and/or insecticides may be applied to an agricultural field. The implement, which deposits the farming material in the soil includes applicators for applying the farming material at predetermined and adjustable rates. In the cab of the tractor is an electronic unit which include apparatus for setting the application rate of the farming material, at least at selected portions of the field, and a communication link between this electronic unit and at least selected applicators on the implement, for conveying information relating to the amount of farming material to be applied for a distance travelled of the implement across the field. Conversion apparatus on the applicator permits converting the amount of farming material to be applied per unit distance to the amount of farming material to be applied per unit of time to thereby account for the speed of the vehicle and thus the implement over the field. The conversion apparatus includes a controller for controlling the applicators regardless of the ground speed to permit the desired amount of material to be applied to the field.

8 Claims, 6 Drawing Sheets

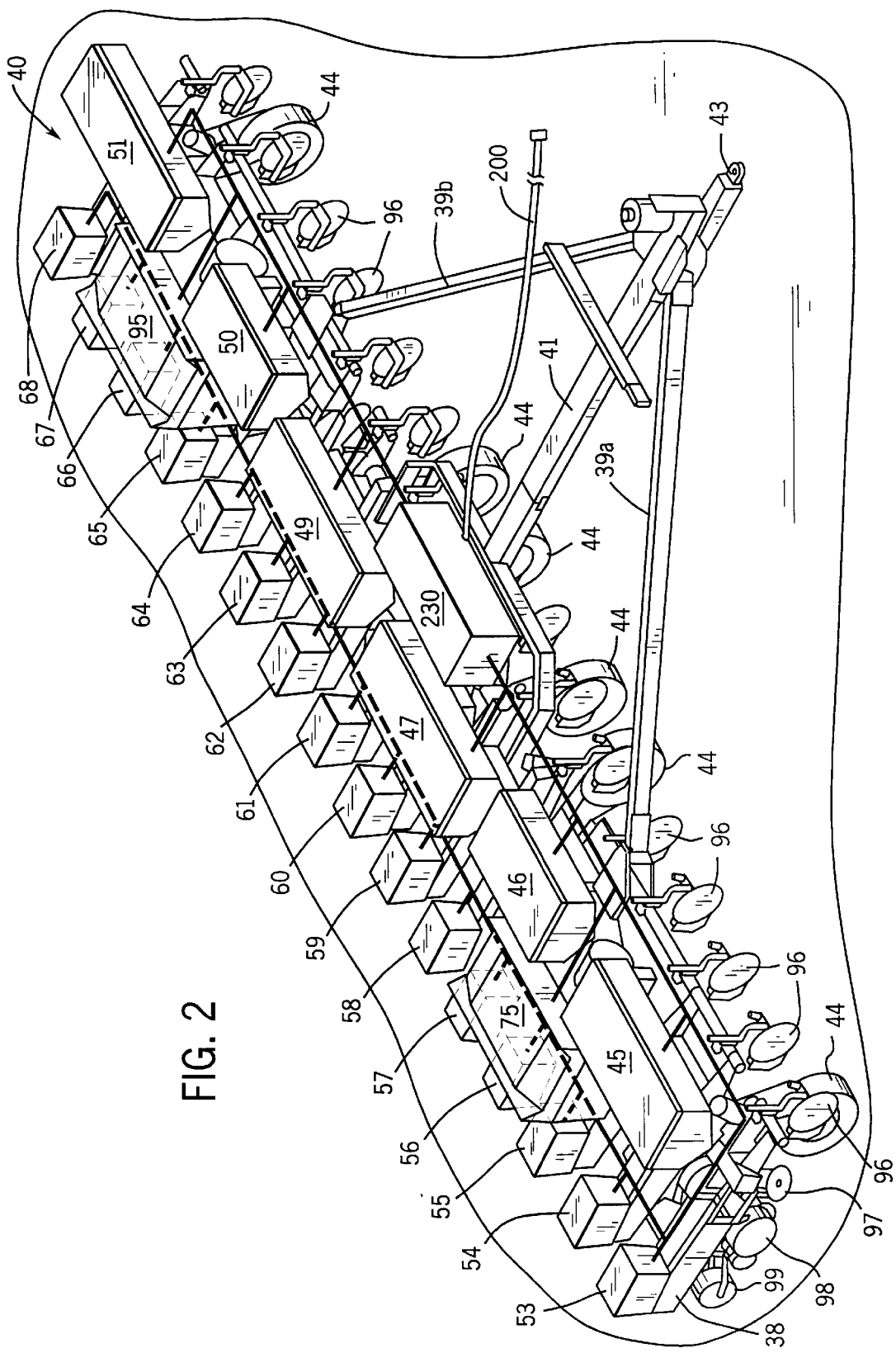

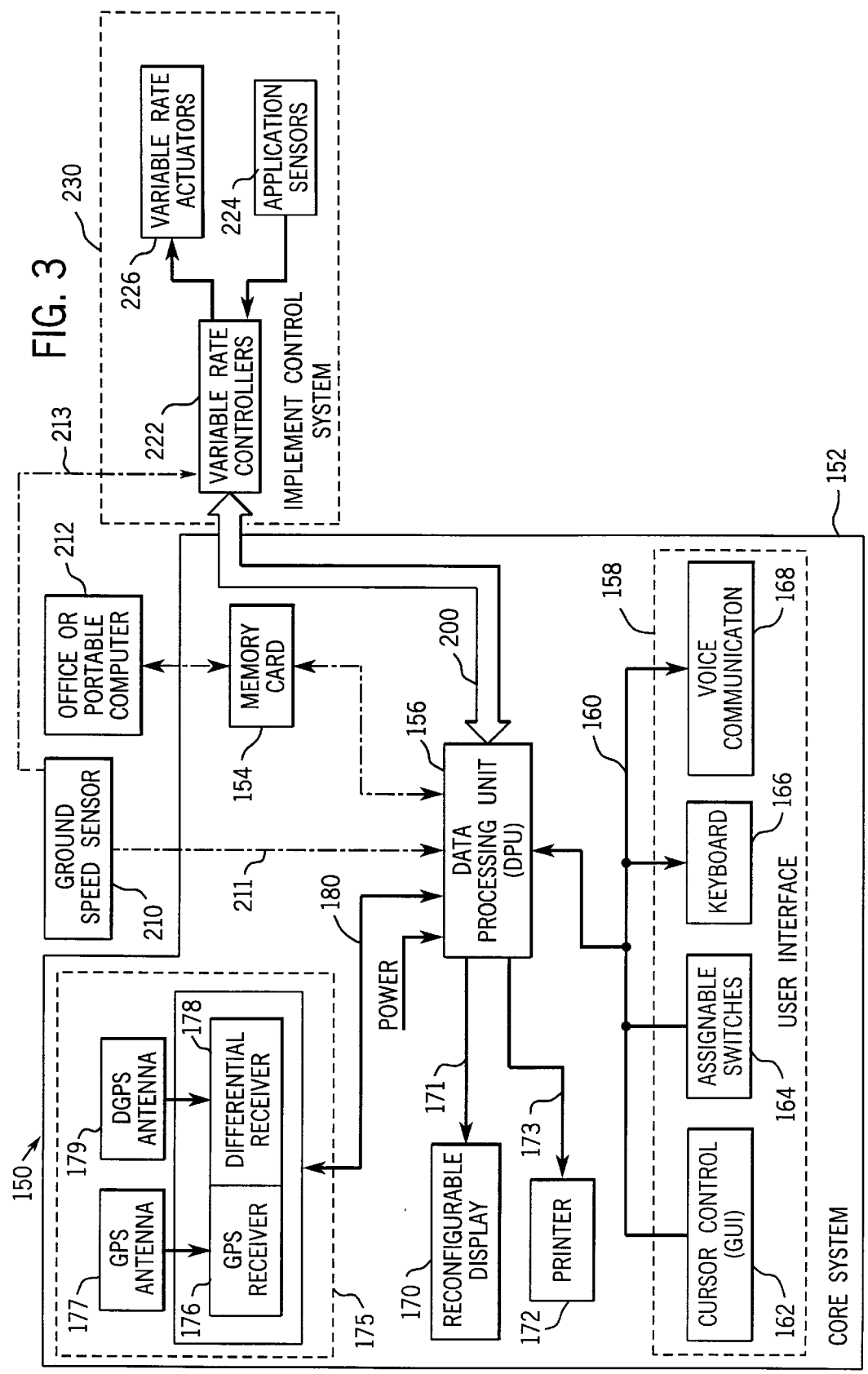

APPARATUS FOR CUSTOMIZING THE RATE AT WHICH FARMING MATERIAL IS APPLIED TO AN AGRICULTURAL FIELD

CROSS-REFERENCE TO RELATED APPLICATION

This application is a continuation-in-part of U.S. application Ser. No. 08/935,406, entitled "Global Controller and Distributed Local Controller(s) for an Agricultural Implement", filed Sep. 23, 1997, issued on Jul. 20, 1999 to Flamme et al. as U.S. Pat. No. 5,924,371.

FIELD OF THE INVENTION

The present invention relates to farming apparatus, and more particularly relates to farming apparatus and a method for customizing the rate at which farming material is applied to an agricultural field.

BACKGROUND OF THE INVENTION

Farming implements such as planters and drills are employed for implanting seeds and the like in agricultural fields. Planters and drills include a frame having one or more sections, with each section supporting multiple row units of farming material applicators, which are configured to apply, for example, seeds to a field as the implement is moved across the field by a work vehicle such as a tractor. The seeds or other products may be stored in one or more bins mounted on or pulled behind the implement. These farming implements or planting implements often include systems for additionally applying granular or liquid fertilizer, insecticide, or herbicide to the seed bed. Seed application rates, in terms of, for example, seeds per lineal meter traversed, are adjustable by the operator for different crops and different growing conditions. A desired application rate, e.g., farming material per acre or per lineal meter, etc., having been established by the operator or by a prescription map, and the implement adjusted to that rate, is desirable that the implement steadily continues to apply farming material such as seeds, fertilizer and insecticide or herbicide at that pre-determined or pre-governed rate. If excessive seed is applied, expensive seed will have been wasted, excessive down time incurred reloading the bins more often than should have been necessary, and plants will be crowded together, oftentimes resulting in weaker and not as well nourished plant systems. Moreover, if too little seed is applied, a smaller harvest than anticipated will be realized. Similarly, deleterious results may occur if other product is not applied at the expected rates, too much of any product may even damage or kill the seed or seedlings, while too little may leave the plants undernourished, in the case of too little fertilizer, or unprotected, in the case of too little insecticide or herbicide.

It has been discovered that uniformity of application of granular products may be enhanced by the use of low pressure air, the air being useful for propelling seeds or granules through tubes to the soil and for promoting seeding of seeds and granules in fluted rolls, pocketed drums, and like devices used for distributing and metering farming product. There are multiple planting and seeding systems sold by Case Corporation, for example, their 955 Early Riser Parallel Front Fold Trailing Planter, the 4012 Concord Air-Till Drill and 2300 Air System; their 900 Series Early Riser Plate Planters, their Soy Bean Special Drills, such as a 5400 or even their 5300 conventional grain drills and the like.

Agricultural planters or implements typically comprise a transversely elongated mobile frame that is conventionally towed behind a tractor or other farm vehicle. These planters include a plurality of row units that are spaced apart on the frame for dispensing fertilizer, seed, herbicides and insecticides to the ground as the implement concurrently moves with the vehicle or the like. In larger agricultural implements, as many as 24 or more row units may be connected to the frame. The spacing between adjacent row units varies as is dependent upon the particular planting operation. Moreover, the amount and size of the particular material which is to be dispensed by the implement or agricultural planter will vary depending upon ground conditions, the climate, the crops desired, geographical location and even if particular portions of the field require more or less of any of the particular material including seed than other parts.

In some of the planters or implements, each row unit may contain an individual bin or hopper for holding the seed or other particulate matter which is to be dispensed. In many of the agricultural planter implements, dry product such as fertilizer is dispensed to the ground or the soil of the field through a metering device which keeps the material flowing while metering the flow. Generally, fertilizer precedes the seed and in the most prevalent embodiment of, for example, Case Corporation, is placed about two inches off the side of the seed bed, while herbicides follow the seed and go on top of the seed bed after the furrow has been closed. Accordingly, in the direction of travel, the front bins normally hold fertilizer, while the smaller rear bins hold herbicides and/or insecticides. In the instance of seed delivery, it is essential that the right amount or quantity of seed be dispensed at particular predetermined locations. Moreover, at certain locations, because of soil conditions, it may be necessary to dispense more or less fertilizer or herbicide and insecticide as historical conditions dictate field yield can be deleteriously affected by too much or too little. Thus, the delivery system for the farming material for the agricultural or planter element must be capable of adjustment even while the implement is moving across the field.

One of the major difficulties with dispensing of farming material is that because of slippage and the like, different quantities of material may be dispensed unnecessarily. Heretofore, the amount of fertilizer, herbicides and the like including the timing of seed planting has occurred due to direct linkage of the applicators to the wheels on the mobile frame. This linkage is usually by an elaborate chain drive through transmissions which affect the rotation of either augers, a fluted roll or other rotating mechanical metering device. In the instance of liquid, for example, a liquid fertilizer, a trailing tank (such as the Case Corporation "Concord" tank) allows for metering of the liquid fertiler by speed of a peristalic or piston pump, again by changing sprockets or the like in chain drives from the ground wheels. While this scheme is very workable, in fields that are other than ideal, wheel slippage and the like does not permit a uniform or desired rates of material dispensing upon the field, again often affecting the field yield. Moreover, and as is the general case, the amount of material to be dispensed during a particular working of a particular field is generally unchangeable without modifying auger or wheel sizes, adjustments of bin openings, fan or blower speed in the event of particulate transport, pump or pressure changes and the like with openings with fluted rolls and the like. Generally, the operator of the farm machine must stop, make those adjustments for a particular part of a field if that is what is required.

Slippage and the like can be accounted for by altering the kind of drive for the different parts of the planter which control the output of the various farming material. For example, slowing down the rotation of the seed drum may still maintain the proper spacing of seeds being planted at their correct distance regardless of wheel slippage. The same is also true of auger or fluted roll rotation for adjustment of hopper or bin output.

Generally, in modern day tractors, the cab includes an electronic display or control units sometimes referred to as a tractor or combine core system, which puts control of the machine and farming implement at the operator's fingertips. The electronic control unit can directly control the various aforementioned drives with regard to the agricultural planter in situations where they are not driven directly by chains and transmissions from the implement's ground wheels. However, because of the number of bins and hoppers and the like on the agricultural planting implement, control commands to the various devices on the agricultural planting implement, and connected to the cab as by a bus or the like, requires updating at a very high rate (e.g., once every 50 milliseconds for each one of the bins or hoppers, etc.). This tends to overload the bus and make control of the amount of farming material dispensed by the applicators associated with the planting implement impractical from the remote cab, at least with today's existing processors.

SUMMARY OF THE INVENTION

In view of the above, and in accordance with the teachings of the present invention, farming apparatus for customizing the rate at which farming material may be applied to an agricultural field is provided. Because coverage of farming material in a particular field is usually given by an amount per acre or amount per distance of the implement travelled, and this rate or amount of farming material to be applied for some distance travelled of the implement across the field does not vary except for large portions of the field, it has been found that by placing conversion apparatus on the applicator for converting the amount of farming material to be applied per unit distance to the amount of farming material to be applied per unit of time, accounts for the speed of the vehicle or farming implement across the field and unloads the bus between the cab of the vehicle and the farming implement. In this connection, farming material is applied to the agricultural field in accordance with a local controller as opposed to the controller or the electronic control unit in the cab. Moreover, by applying the sensor ground speed signal which signals the instantaneous velocity of the implement over the field to the conversion apparatus, local control of the rate of application of farming material and finer adjustment of the same to the agricultural planting implement is effected.

With the electronic display unit or core system in the tractor or combine, a location signal generation circuit supported by the vehicle and configured to receive location signals and to generate location signals therefrom is coupled to a control element which is coupled to the unit's input device such as keyboard, memory and the like. In this manner, the location signal generation circuit which is also coupled to the control element permits the control element to generate data representative of the amount of farming material intended for deposition on the field at predetermined locations thereon. This permits the control element to process the location signals to generate location data representative of the corresponding locations as a selected ones of the farming material applicators in the field. A digital memory which is coupled to the control element allows correlation of the data representative of the amount of farming material with the respective location data and stores the resultant data with the correlation location data in digital memory. In this manner, signals may be applied to the planting implement and its associated applications only when the amount of farming material per distance travelled needs to be changed. Because the speed of the vehicle over the ground and variations therein are taken into account by the local controller or controllers on the farm planting implement, the amount of material applied per unit of time is easily adjusted negating the tendency of local control from the cab of the tractor from overloading the bus.

BRIEF DESCRIPTION OF THE DRAWINGS

Other advantages of the invention will become more fully understood from the following specification and claims taken in conjunction with the accompanying drawings in which:

FIG. 2 is a schematic perspective view of a typical 16 row planter with a dry fertilizer attachment applicator, seed module applicators and herbicide and insecticide applicators on the planting implement, which material application is controlled by and in accordance with the present invention;

FIG. 3 is a schematic block diagram illustrating a site-specific farming system including a display and a control element for applying to the planting implement the amount of farming material required for some predetermined distance or area covered by the implement as it is towed over the field by the farm vehicle;

DETAILED DESCRIPTION OF THE PREFERRED EMBODIMENT

Figure 1:
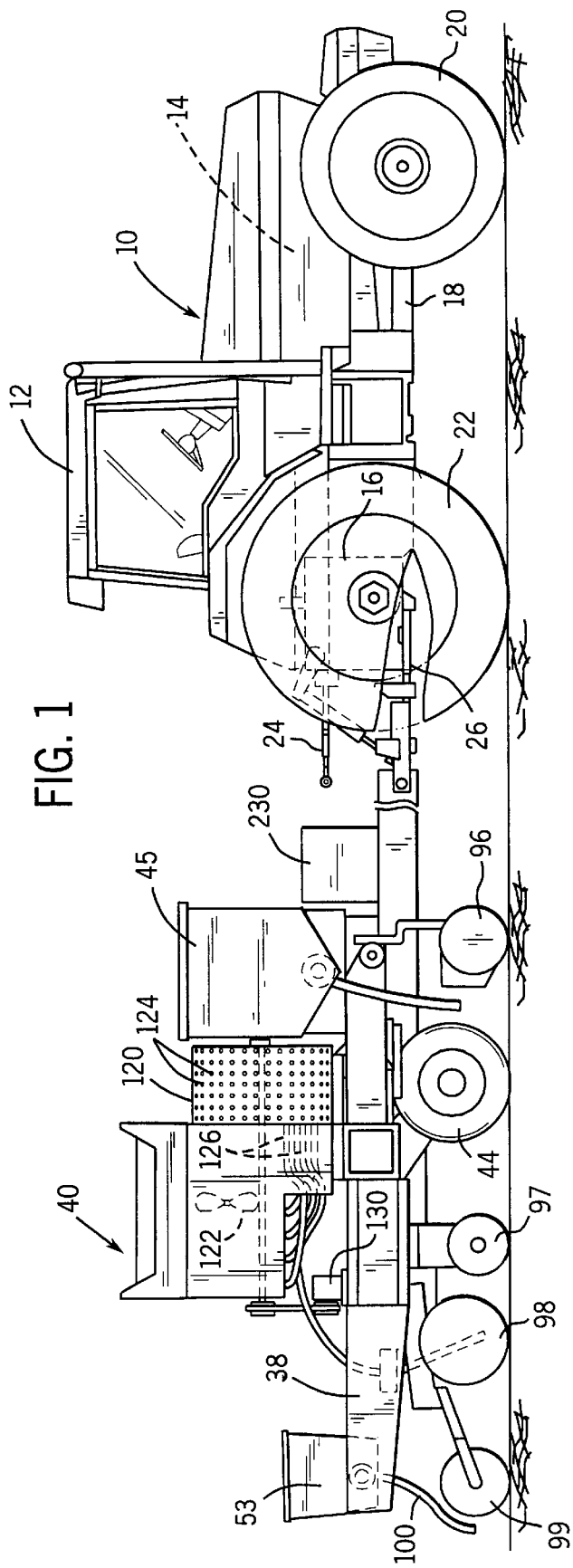
FIG. 1 is a schematic view of a farm vehicle with an exemplary agricultural planter element in cross section as shown being towed by the farm vehicle over an agricultural field.

Turning now to the drawings, and especially FIG. 1 thereof, a typical farming implement 40 is shown attached to a farming vehicle in the illustrated instance or tractor 10, including an operator control cab 12. The tractor 10 includes an engine compartment 14, the engine of which is coupled to a drive train 16 and 18 to the rear and front wheels 22 and 20, respectively, of the tractor 10. The tractor may be coupled as by a three point hitch 24 or by means of a standard draw bar 26 to the frame 38 of an implement 40 for towing the implement across agricultural fields. The implement 40, as illustrated in FIGS. 1 and 2, includes ground support wheels 44 connected to the frame 38, which in turn supports a plurality of row planters, in the illustrated instance 16, in spaced apart relation across the frame 38. As illustrated, the frame is connected as by the draw bars 39a, 39b and a central hitch rail 41 to a coupling and the like 43 for connection to the draw bar 26 of the tractor 10. Mounted on the frame and connected transversely to the direction of pull are four spaced apart, three-outlet dry fertilizer hoppers 45, 47, 49 and 51. Intermediate three-outlet dry fertilizer hoppers 45, 47, 49 and 51, are two, two-outlet dry fertilizer hoppers 46 and 50.

Referring once again to FIG. 2, to the rear of the frame 38 is placed 16 herbicide/insecticide bins 53–68, respectively. Intermediate herbicide/insecticide bins are positioned a pair of cyclone air seed modules 75, 95, respectively, each of the seed modules providing outlets, as shall be described hereinafter, for eight of the 16 row units for depositing seed at predetermined intervals in furrows made in the soil of the field. Briefly, fertilizer in the bins 45–51 is supplied to the ground through a metering device which controls the flow of the fertilizer and keeps it moving from the bins to the ground as the implement moves over the field. The fertilizer precedes the seed, and is deposited adjacent, e.g., two inches off to the side of the seed bed while herbicides/insecticides follow the seed application and go on top of the seed bed after the furrow has been closed. As illustrated in both FIGS. 1 and 2, a first disk 96 associated with each of the fertilizer bins or row units, opens a furrow and fertilizer is deposited to the side of the furrow, but adjacent the opening. A preliminary partial furrow closer partially fills the furrow over the fertilizer and before applying seed, an additional furrow opener 97, associated with each of the row units, allows an additional furrow to be opened for depositing the seed at predetermined intervals along the furrow. A furrow closer 98 closes the loose soil over the deposited seeds. A furrow packing wheel 99 gently wheels over the mixture covering the furrow tamping the soil to insure seed is deposited at the depth desired in the furrow. Thereafter, herbicide/insecticide may be deposited as by a tube or the like tube 100 associated with each of the herbicide/insecticide bins 53–68.

The means by which seed is deposited into the furrows is by the well known drum or barrel type dispenser 120 which is fed seed and the like from a hopper 75 or 95, (see FIG. 1), and due to air pressure provided by a blower 122 maintains seed in peripheral, spaced apart, row-like apertures 124 circumscribing the barrel 120 of the seed applicator. Seed pick-up tubes 126, disposed interiorally of the barrel, conduct the air and single seeds at a time at the appropriate stations to the ground or soil. The amount of seed outputted through the tubes per unit of time (i.e. the rate of seed deposition), such as by the tube 127, is dependent upon the air pressure provided by the blower but more dependent upon the speed of rotation of the barrel or drum 120. The drum 120 is rotated as by drive means 130 under control of a localized controller on the implement 40. Such a seed applicator is illustrated and described more completely in U.S. Pat. No. 5,655,468, issued on Aug. 12, 1997 to the Assignee of the present invention and herein incorporated by reference. The fertilizer bins, 45–51, conventionally employ either augers or fluted type rolls to ensure an even and smooth dispensing of material through their outlet tubes. The augers and rolls are also under control of drive means, and under control of controllers mounted on the element 40. In a like manner, herbicide contained in the bins 53–68 each include a paddle wheel or fluted roll type dispenser control to ensure the uniform application of herbicide through tubes such as the tube 100 illustrated in FIG. 1.

In accordance with the invention, the amount or dosage of farming material to be applied for each acre or portion of the field is calculated by a control element or data processing unit in a core element located within the cab 12 of the tractor 10. This is converted to the amount of actuator or applicator motion per distance of the planter travelled and sent by way of a bus 200 to implement controller 230 where, due to ground speed sensor 210 input, variable rate controllers 222 allow for calculation of the applicator or actuator motion per unit of time so that the proper amount or dosage of farming material, whether it be seed, fertilizer, herbicide or insecticide is deposited at the time and the locations required.

Turning now to FIG. 3, a site-specific farming system 150 is illustrated therein. The farming system 150 includes one or more core systems 152 which provide data processing functions for different agricultural vehicles and implements including the example tractor 10 as well as combines (not shown). In the farming system 150, each tractor or combine is equipped with its own core system 152. Each tractor 10 is also equipped with a bus 200 which communicates with the implement controller 230.

The core system 152 is portable and may be installed on a variety of agricultural vehicles. When installed in the tractor 10, which is connected by a bus 200 to the implement controller 230, the core system 152 may be configured to operate in an "apply" mode wherein it controls, records and displays monitored data. (The core system may also be operated in a data "collection" mode so as to collect, record and display monitored or collected data). The displayed data may include either previously recorded data, for example, a prescription map, or the actual monitored data, that is the sensed feedback as from application sensors 224 associated with the fertilizer/seed/herbicide/insecticide hoppers and/or bins.

The farming system 150 may also include a work station or computer, in the illustrated instance an office or portable computer 212, which may be located in an office on the farm or may be portable and carried within the cab of the tractor 10. The office or portable computer 212, in conjunction with the core system 152 employs communication medium to transfer site specific data between the core system 152 and the computer 212. Each of the systems, i.e., the core system 152 and the computer 212, includes a conventional read write interface for removable memory, such as a memory card 154 which may be transported between core system 152 and computer 212. The memory card 154 may be typically of type II PCMCIA cards made by, for example, Centennial Technologies, Inc. However, other communication mediums such as floppy or hard disks, RF, Infrared, RS232/485 links etc. may be employed. Memory card 154 may be used to transfer site-specific data from the core system 152 to the office or portable computer 212 and to transfer prescription maps from the office or portable computer 212 to the core system 152.

Core system 152 includes a control element, in the present instance comprising a digital data processing unit (DPU) 156 which communicates with the vehicle operator located in the cab 12 of the tractor 10 through a user interface 158 by way of links 160 (for example, an RS232/485 interface; a standard keyboard interface, etc.). DPU 156 includes a processor, for example, a 486DX or Pentium® microprocessor and various types of memory which may include non-volatile memory (PROM, E-PROM or Flash memory) as well as volatile memory (RAM). As is conventional, the processor may execute a program stored in non-volatile memory and the volatile memory (RAM) may include a battery backup circuit to hold portions or all of the programs in high speed memory or hold selected application programs and/or routines as desired. Alternatively, DPU 156 may be implemented utilizing dedicated, specific purpose logic or hard wired logic circuitry. Moreover, the DPU and associated functions may be replaced by an enhanced cab display unit ECDU sold by Case Manufacturing Co. User interface 158 may include a graphical user interface (GUI) 162 providing cursor control (e.g., by a mouse, joy stick or other switch control with cursor in the like movement possibilities), assignable switches 164 (for example, push buttons and the like) configurable by the processor, a keyboard 166 and a voice communication interface 168.

The data processing unit DPU 156 is configured to generate display signals which are applied to a reconfigurable display 170 (e.g., a CRT or flat screen LCD display) via communication link 171. The display 170 is preferable an active matrix LCD capable of displaying full motion video and a number of colors under varying ambient light conditions while also displaying graphics and alphanumeric characters. Display 170 is used, interalia, to display the current configuration of assignable switches 164. The data processing unit or DPU 156, user interface 158 and display 170 are preferably located in the tractor cab 12 and positioned so that the operator has easy access to user interface 158 and an unobstructed view of the display 170. If desired, core system 152 may also include a printer 172 in the cab which communicates with DPU 156 via an interface link 173 (for example, an RS232 serial or a "Centronics" type parallel link).

The data processing unit 156 may also receive signals representing the speed of the vehicle from the ground speed sensor 210 via an interface 211, which also provides an output 213 to the variable rate controllers 222 of the implement controller 230. Ground speed sensor 210 may be of any convenient type and include a magnetic pickup sensor configured to sense the speed of the vehicle's wheels or transmission output, or may include a radar device mounted to the body of the vehicle. The speed signals may be used by the data processing unit 156 to calculate distance travelled, or used, in accordance with the invention, for allowing calculation by variable rate controllers and conversion of amount of farming material per distance to be converted to amount of farming material to be applied per second or other unit of time so as to permit direct control of the variable rate actuators or applicators associated with the fertilizer, seed and herbicide/insecticide farming material.

As shown in the drawings, specifically FIG. 3, the data processing unit 156 also communicates with a location signal generation circuit 175 which generates location signals representing the vehicle's location. Circuit 175 includes a global positioning system (GPS) signal receiver 176 with an associated antenna 177 and a differential GPS (DGPS) signal receiver 178 also having an associated antenna 179. It is understood that a single antenna may be employed in lieu of antennas 177 and 179. GPS receiver 176 may, for example, be manufactured by Trimble Navigation Ltd. of California and DGPS receiver 178 may be manufactured by Satloc, Inc. of Arizona. GPS receiver 176 determines longitude and latitude coordinates (and altitude for that matter) of the vehicle from signals transmitted by the GPS satellite network. The accuracy of the location data is improved by applying correction signals received by DGPS receiver 178. The differential correction signals are used to correct errors present on GPS signals including the selective availability error signal added to GPS signals by the U.S. government. DGPS signals are transmitted by the United States Coast Guard as well as by commercial services. For example, the Omnistar DGPS system from John E. Chance and Associates of Texas includes a network of ten land-based differential reference stations that send correction signals to a master station which uploads signals to a satellite for broadcast throughout North America. GPS differential correction signals may also be transmitted from a local base station such as the top of a building. In a preferred embodiment, DPU 156 interfaces with a SATLOC L-Band Integrated Terra Star DGPS system via an RS485 communication link 180.

When core system 152 is mounted on a tractor such as the tractor 10, the data processing unit DPU 156 communicates with implement control system 230 by way of bus 200. The implement control system 230 includes one or more variable rate controllers 222, which in turn control variable rate actuators 226 for the applicators. For example, there may be a single controller which controls the seed modules 75 and 95; three-six controllers for controlling the output of the fertilizer hoppers 45–51, and; two-sixteen controllers for controlling the herbicide/insecticide flow onto the soil. The variable actuators 226 will be described more fully hereinafter with regard to FIGS. 4–7. Suffice at this point that the variable actuators permit altering the dosage of farming material applied to the soil in accordance with signals received from the variable rate controlled 222 associated with the particular actuator. Applicator sensors 224 may sense a variety of conditions depending upon association with fertilizer, seeds or herbicides/insecticides. For example, the application sensors may determine the quantity of the material left in hoppers, bins and the like, all of which data may aid in determining the flow rate. The data processing unit 156 also reads application rate data for particular field location from a prescription map, which is a map giving locations where a prescribed amount of a farming material (e.g., seed, fertilizer, herbicide, etc.) may be supplied to achieve a particular desired farming result. The prescription map may be supplied by the office or portable computer 212 or the data processing unit 156 may receive data from the input apparatus 158 employed by the machine operator to manually set a desired material application rate and generate commands which are sent to the variable rate controllers 222.

While the commanded output rate of material to be provided to a field is conventionally a function of the speed of the tractor 10 (or combine) and the desired material application rate, it has been found that with multiple fertilizer bins, herbicide bins, and seed modules or hoppers all of whose deposition rates need to be controlled, an update, even at a processor slow rate of once every 50 milliseconds, can lead to bus overload because of the variations in speed due to slippage and the like, and the number of items needed to be controlled by updating. Moreover, it is critical that when an increase or decrease of material is required, for example, an increased speed requires an increased material output per unit of time to maintain a constant desired material application rate. In view of the above, it has been found that by providing variable rate controllers 222, e.g., microprocessors and the like, with information from the DPU 156 as to the applicator or actuator motion required per distance of the implement 90 travelled, the actuator or applicator controller (variable rate controller 222) may effect the calculations necessary so that the applicator or actuator motion per unit of time will allow the proper or desired material application rate to be obtained. The application sensors 224, as has been noted heretofore, provide feedback signals representing the actual application rates to enable closed loop control, if such is desired. The bus 200 may be an RS485 bus for a single channel variable rate controller or an SAJ-1939 implement bus for a multi-channel controller. Essentially this means that by transferring the application amount per distance travelled of the implement, to the controllers 222, providing a ground speed input to the controllers as via line 213, the amount of material per unit of time may be easily calculated by the controller so as to control the variable actuators or applicators motion to coincide with the quantity of farming material required for depositions. Moreover, in this manner, if a field being provided with farming material has different portions which require different quantities, selected portions of the field may be treated with a changing or varying amount of farming material in accordance with the desires of the operator or in accordance with a prescribed prescription map, from time to time without overloading of the bus 200.

Figure 4A:
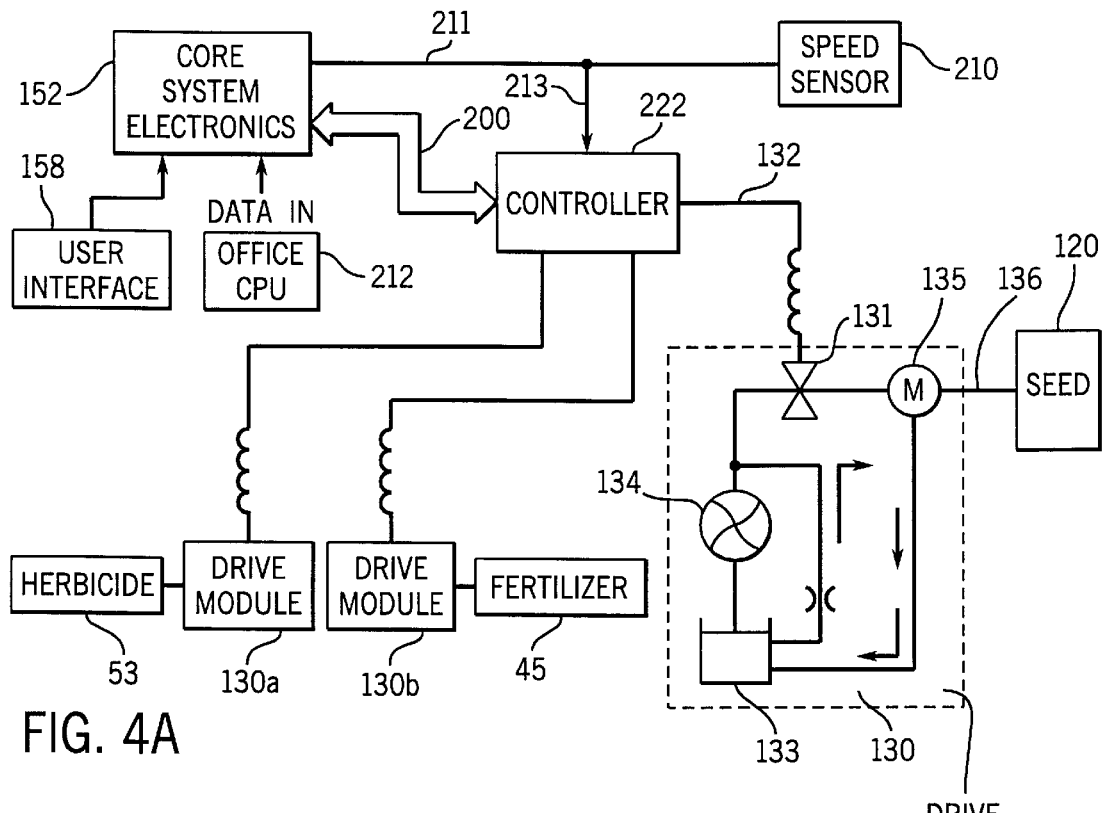
FIG. 4A is a schematic diagram of means for controlling the rate of farm material application to a field.
Figure 4B:
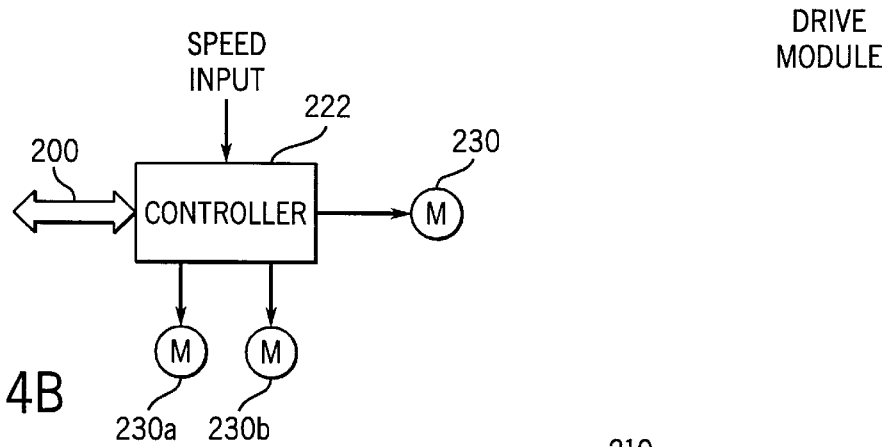
FIG. 4B is similar to FIG. 4A except showing an alternate means for controlling the application rate of the farming material to a field.
Figure 7:
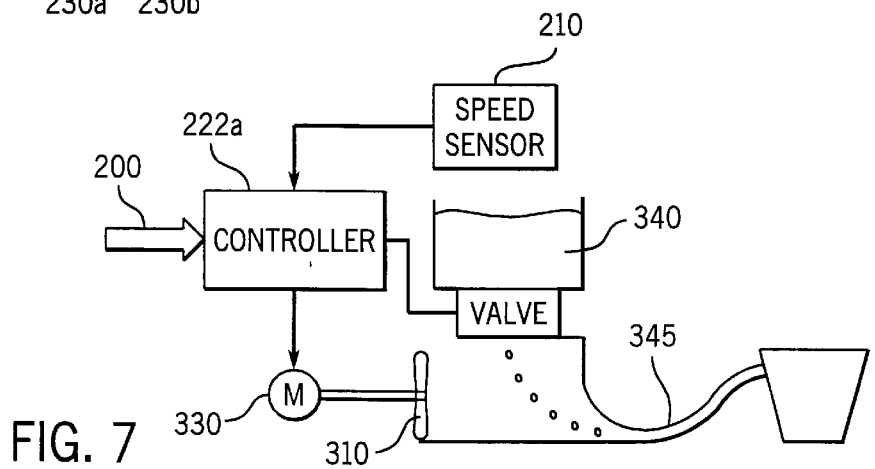
FIG. 7 schematically illustrates apparatus for controlling the flow of particulate matter, for example, to the refill bins or hoppers on the planting implement.
Figure 5A:
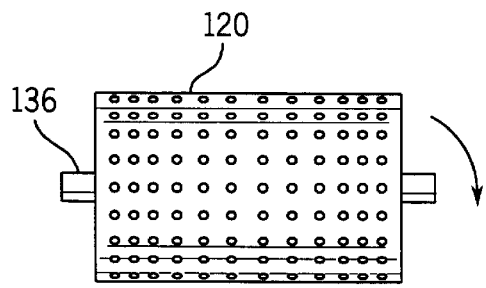
FIG. 5A illustrates schematically sample apparatus for applying seed, and the means for controlling the amount placed per unit of time.
Figure 5B:
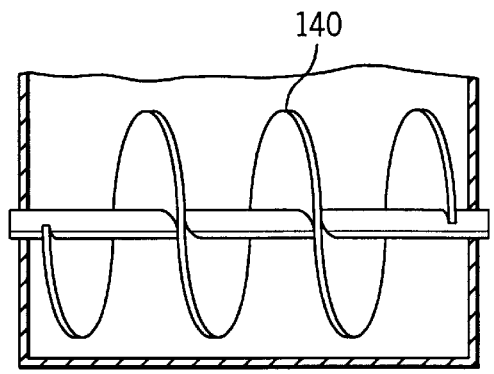
FIG. 5B is another schematic diagram illustrating a means for controlling the application of particulate matter such as fertilizer to a field.
Figure 5C:
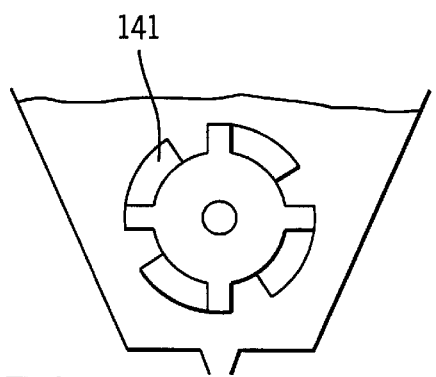
FIG. 5C illustrates yet another means for controlling the application of particulate matter to a field.
Figure 6:
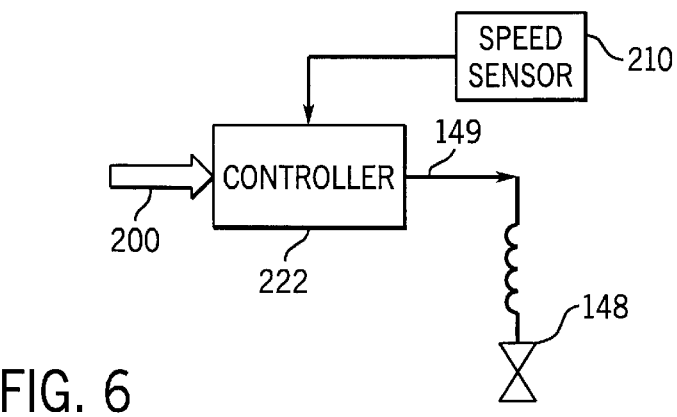
FIG. 6 illustrates another means by which the amount of granular or particulate matter may be controlled, as to its rate of application upon a field.

Referring now to FIG. 4A, a schematic representation of the means for controlling the applicator or actuator motion per unit of time to control the quantity of farming material applied per unit of time, is illustrated therein. To this end, a separate controller 222 or a multiple channel controller or microprocessor, depending upon the power and speed of the microprocessors, may be connected to one or more drive modules such as the drive module 130 associated with the drum or barrel 120 of the seed module 75 and/or 95. Whether separate controllers are employed for actuator control of the output of each bin depends upon several factors such as cost, need for fineness of control, etc. In the illustrated instance, the drive module 130 is shown as including a solenoid actuated valve 131 which is opened or closed in varying degrees as by a signal applied from controller 222 to the solenoid as through line 132. The valve 131 allows hydraulic fluid to flow from a sump 133 to a hydraulic pump 134 and then through a hydraulic motor 135, the shaft 136 of which may be coupled directly to the barrel or drum 120, or by suitable belts, gears or chain. Power for the pump 134 may be derived from the power take-off from the tractor 10 or may be operated itself by hydraulic fluid lines leading from the tractor to the pump. The drive modules 130a and 130b for an auger 140 or fluted roll 141 associated respectively with the herbicide bins 53 or fertilizer hoppers 45–51 may be identical to the drive module 130. Alternatively, and as illustrated best in FIG. 4B, the controller 222 may directly control the speed of electric motors 230, 230a and 230b and their associated augers or fluted rolls 140, 141 for herbicide/insecticide bins 53–68 and fertilizer hoppers 45–51, respectively. In this manner, the rotational speed of the actuators associated with the applicators may be adjusted so as to allow a change in the application rate of material per unit of time, all of which may be calculated by the controller 222, as long as the original information fed into the controller includes data which assimilates or is associated with the amount of material to be deposited per unit of distance travelled by the implement 40.

In certain instances where the auger or fluted rolls may be driven at a constant speed, it is often desirable to provide the hopper or bins with a gate control, the opening of which will control the amount of farming material allowed to leave the hopper or bin (depending upon particulate size of the fertilizer, herbicide or insecticide) and once again depending upon the speed of the implement across the ground. In this instance, the gate control may be solenoid operated as by gate control valve 148, its opening being dependent upon the signal received under line 149 from the controller 222.

In certain instances where additional material is needed for the hoppers or bins while the implement is being towed across a very large field, a trailed hopper supply such as a "Concord" trailer manufactured by Case Corporation (not shown) is connected to the implement 40 so that replenishment may take place even though the farming vehicles are some great distance away from the barn or other locations where supplies are normally replenished. This may be accomplished on the fly, once again, if the controller or controllers are placed on the trailed hoppers for controlling or permitting particulate material or even liquid material to be applied to the bins or hoppers on the implement 40. To this end, and referring now to FIG. 7, one or more variable rate controllers 222a, which receive inputs from the bus 200 and a second input from a speed sensor 210 applies its output to at least a controller actuator for the particulate supply. In one instance, the controller varies the speed of a fan 310, which may be driven by a drive module similar to the drive module 130 heretofore described or to electric motors, in the illustrated instance an electric motor 330, to increase or decrease the fan flow rate to carry particulate material from the bins or hoppers and the like 340 on the trailed implement through a chute or piping 345 to the appropriate bins or hoppers on the implement 40. An alternative or additional control of the amount of material applied through the piping 345 to the bins or hoppers may be provided by a gate control or slide valve similar to the gate control or slide valve 148 described heretofore with regard to FIG. 6. The gate or slide control valve may be operated in a similar manner to that heretofore described merely by allowing the opening from the auxiliary or additional hopper 340 to be increased or decreased, with or without a commensurate increase or decrease of the rotational velocity of the motor 330.

Figure 8:
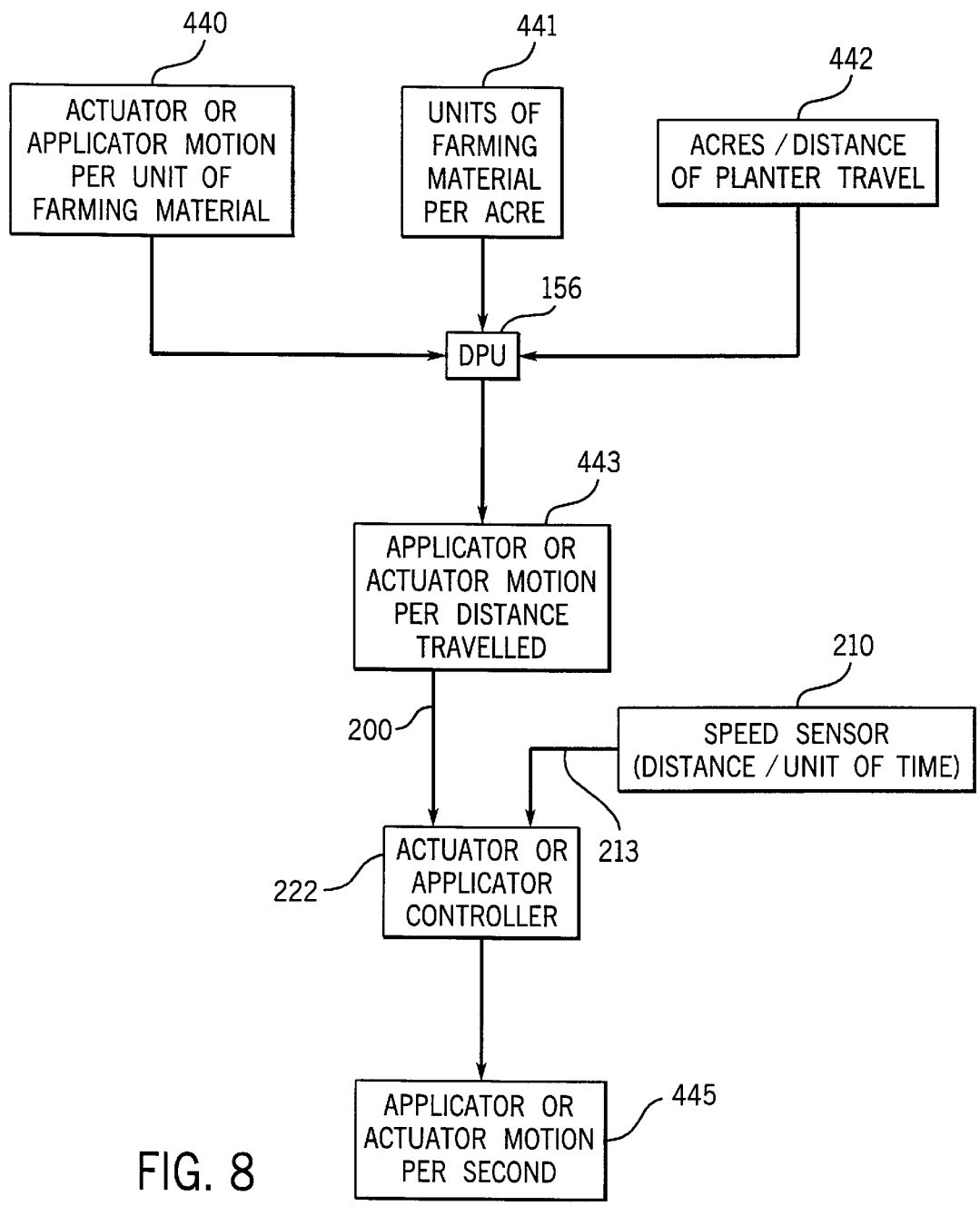
FIG. 8 is a block diagram flow chart illustrating the manner in which the planting implement may control the amount of farming material applied per unit of time upon receipt of the amount of material per unit of distance from the control element.

The operation of the invention is best illustrated in the flowchart of FIG. 8 wherein data 440, 441 and 442 may be applied to the data processing unit 156. In the illustrated instance, the data 440 comprises actuator or applicator motion per unit of farming material to be applied, e.g., revolutions of the drum or barrel 120 per unit of farming material. In the event that the farming material is, for example, seeds, the amount can be rated in pounds or ounces, etc. and the applicators or actuators motion, in the illustrated instance the barrel 120, movement in rotational increments or a fraction of or a portion of a rotation of the barrel. An additional input that is required either by the operator in the cab or from the prescription map and which may be applied to the data processing unit 156 is as shown in block 441, where the units of farming material need be indicated per unit area, e.g. acre. In the illustrated example of the implement 40, these units of farming material would be, for example, pounds of seed, pounds of fertilizer, and pounds of herbicide/insecticide per acre. A third and desired input would be the number of acres per distance of planter travel. For example, assume that a 16 row planter is approximately 32 feet wide. Inasmuch as an acre is 43,560 square feet, one path or one movement of the implement 40 for 1,360 feet (approximately) will indicate the distance that must be travelled for the application of the amount of material for application to one acre. From the foregoing data, it is easy to see that the output of the data processing unit 156 is the applicator or actuator motion necessary for the distance travelled for the planter or implement 40 to be able to place the amount of material desired. This is illustrated in block 443. The output of the data processing unit 156 is applied to the variable rate controller 222 (or controllers for particular bins or hoppers and particular farming material) which is simultaneously fed with information or data from the speed sensor 210 over line or lead 213. The speed sensor's output, as is conventional, is measured in distance per unit of time, for example, meters per second, miles per hour, etc. Because the initial input included the units of farming material per acre, the output of the actuator or applicator controller 222 to the particular applicator, represented in block diagram form at 445, indicates the applicator or actuator motion per second which then, due to the variations in the speed input, is easily adjusted without overloading the bus 200.

It is easy to understand that, for a particular example, e.g., seed application, the mathematics of the conversion information supplied by the data processing unit to the actuator or applicator controller 222, is as follows:

Units of farm material/unit area (lbs./acre)×No. of unit areas/distance travelled (N acres/y meters)× Revolutions of applicator (drum)/unit of farm material=Revolutions of applicator (drum)/distance travelled (Revs/meter)

Revolutions of applicator (drum)/distance travelled Revs/meter)×distance travelled/unit of time (meters/sec)= Revolutions of applicator/unit of time=Revs/sec.

Although the invention has been described with a certain degree of particularity, numerous changes in the construction and method of operation of the invention may be made without departing from the spirit and scope of the invention as set forth in the claims appended hereto.

What is claimed is:

1. Farming apparatus for customizing a rate at which various selected farming material is applied to an agricultural field, comprising:

a vehicle movable at varying speeds over the field;

an implement connected to said vehicle for concurrent movement across said field, said implement including applicators having farming material inlets and outlets for receiving and applying an amount of the selected farming material to the soil of said field at predetermined rates; an electronic control element on said vehicle including input apparatus for setting an application dosage of farming material at least for selected portions of said field, and a communications link between said electronic control element and at least one of said applicators for conveying information relating to the amount of farming material to be applied by said at least one of said applicators per unit area traveled of said implement across said field;

conversion apparatus mounted on said implement and associated with said at least one applicator for converting the amount of farming material to be applied per unit area to the amount of farming material to be applied per unit of time to thereby permit adjustment of the amount of the selected farming material from said output of said applicator proportionally to the speed of said vehicle, and thus said implement, over said field.

2. Farming apparatus for customizing the rate at which farming material is applied to an agricultural field in accordance with claim 1, including sensor means for signaling an instantaneous velocity of said implement over said field, and means for applying said signal to said conversion apparatus.

3. Farming apparatus for customizing the rate at which farming material is applied to an agricultural field in accordance with claim 2, including:

a location signal generation circuit supported by the vehicle and configured to receive location signals and to generate location signals therefrom;

said electronic control element coupled to the input apparatus and the location signal generation circuit, the control element configured to generate data representative of an amount of selected farming material intended for deposition on said field at predetermined locations thereon, and to process the location signals to generate location data representative of the corresponding locations of selected ones of said applicators in the field; and a digital memory coupled to the control element, the control element further configured to correlate data representative of the application dosage of farming material with respective location data, and to store resultant correlated data in digital memory.

4. Farming apparatus for customizing the rate at which farming material is applied to an agricultural field in accordance with claim 1 wherein said implement includes a plurality of farming material holding receptacles, and at least some of the applicators include means for adjusting their output of farming material.

5. Farming apparatus for customizing the rate at which farming material is applied to an agricultural field in accordance with claim 1 wherein said conversion apparatus comprises a controller mounted on said implement:

a bus connecting said electronic control element to said controller, and;

sensor means for signaling an instantaneous velocity of said implement over said field to said controller.

6. Farming apparatus for customizing the rate at which farming material is applied to an agricultural field in accordance with claim 5 wherein said implement includes a plurality of different farming material holding receptacles having farming material inlets and outlets, and at least some of the applicators include means for adjusting the farming material output of said outlets of said receptacles in accordance with a signal received from said controller to vary a rate of farming material application in accordance with the speed of said implement across the field.

7. Farming apparatus for customizing the rate at which farming material is applied to an agricultural field in accordance with claim 6, including:

a location signal generation circuit supported by the vehicle and configured to receive location signals and to generate location signals therefrom;

said electronic control element coupled to the input apparatus and the location signal generation circuit, the control element configured to generate data representative of the application dosage of farming material for deposition on said selected portions of said field at predetermined locations thereon, and to process the location signals received from said location signal generation circuit to generate location data representative of the corresponding locations of selected ones of said applicators in the field as correlated with the amount of farming material to be deposited at said selected portions of said field and to generate resultant correlated data from said received location data with said amount of farming material to be deposited; and a digital memory coupled to the control element for storing the resultant correlated data.

8. Farming apparatus for customizing the rate at which farming material is applied to an agricultural field in accordance with claim 5 wherein said implement includes a plurality of farming material holding receptacles, and at least some of the applicators include variable rate drive means for adjusting farming material output of said applicators in accordance with a signal received from said controller.

* * * * *